June 9, 1925.  E. R. WHITE ET AL  1,541,300
LUMBER HANDLING ROLLER
Filed April 30, 1923
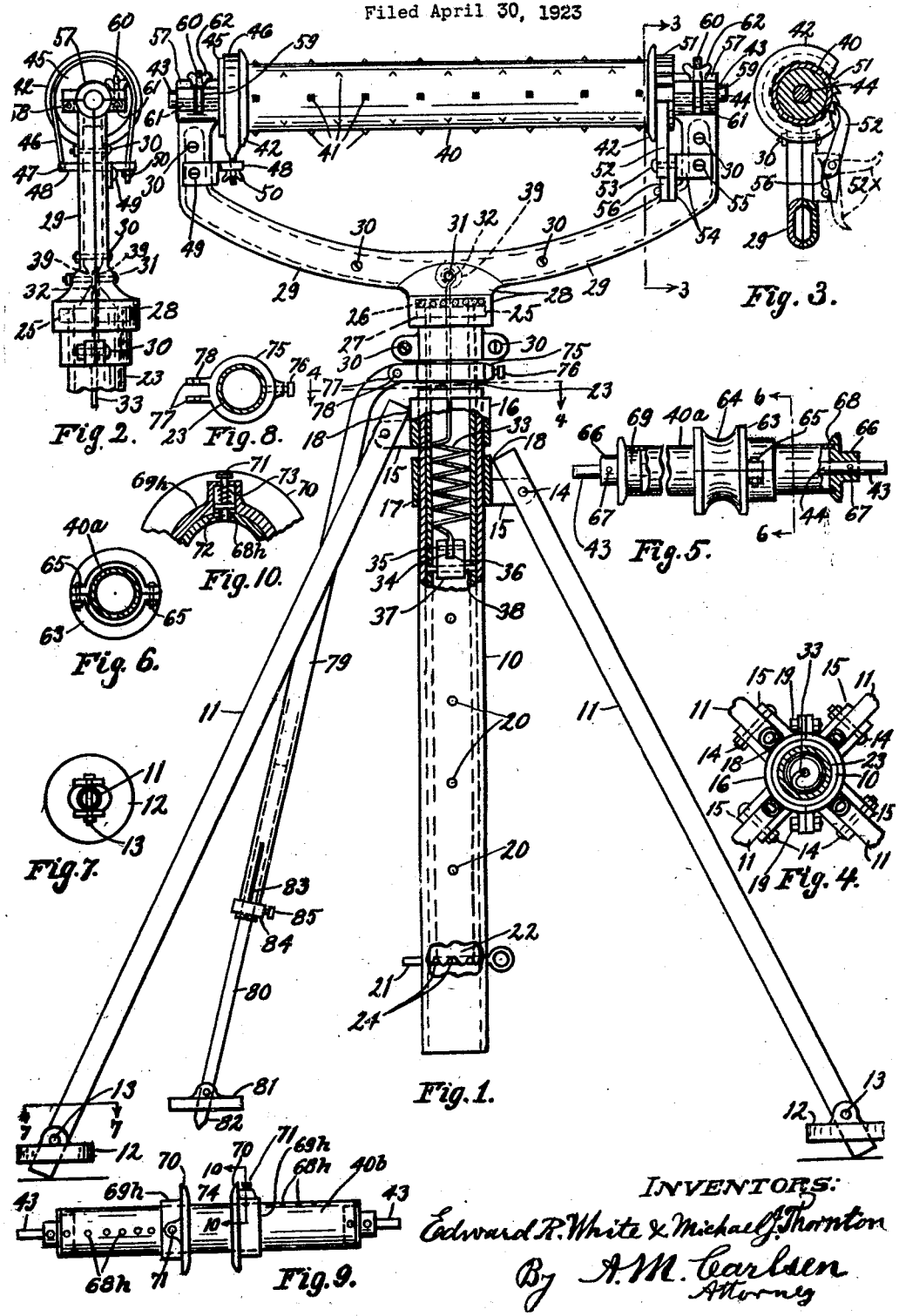

Patented June 9, 1925.

1,541,300

UNITED STATES PATENT OFFICE.

EDWARD R. WHITE AND MICHAEL J. THORNTON, OF ST. PAUL, MINNESOTA; SAID THORNTON ASSIGNOR TO IRENE M. WHITE, OF ST. PAUL, MINNESOTA.

LUMBER-HANDLING ROLLER.

Application filed April 30, 1923. Serial No. 635,636.

*To all whom it may concern:*

Be it known that we, EDWARD R. WHITE and MICHAEL J. THORNTON, citizens of the United States of America, residing at St. Paul, in the county of Ramsey and State of Minnesota, have invented certain new and useful Improvements in Lumber-Handling Rollers, of which the following is a specification.

Our invention relates to devices for handling lumber, bar iron, pipes and other articles, and the object is to provide a highly improved stand with a roller in its top upon which lumber and other articles may rest and swing into any position required for handling such articles or for removing them from a pile, a rack or a shed, car, etc.

In the accompanying drawing:

Fig. 1 is a partly sectional side elevation of the device complete except for special rollers used for certain purposes. Fig. 2 is a left hand end view of the upper portion of Fig. 1. Fig. 3 is a section on the line 3—3 in Fig. 1. Fig. 4 is a section on the line 4—4 in Fig. 1. Fig. 5 is a partly sectional side view of one of the special rollers already referred to. Fig. 6 is a section on the line 6—6 in Fig. 5. Fig. 7 is a section on line 7—7 in Fig. 1 of either one of the legs of the stand. Fig. 8 is a detail top view of the collar 75 in Fig. 1. Fig. 9 is a side view of another special roller. Fig. 10 is an enlarged section on the line 10—10 in Fig. 9.

Referring to the drawings by reference numerals, the main stand is composed of a vertically disposed body tube 10 supported by four normally spread legs 11 having their lower ends provided with shoes 12 pivoted at 13 to allow them to tilt and fall flat upon the ground and support the legs where the ground may be too soft to resist the ends of the legs. The legs may be solid but we have shown them as preferably made of pipes. The legs are arranged in two pairs, each pair being pivoted at 14 between radial lugs 15 of two collars 16 and 17, one pair to each collar and bear with their upper ends against the collar as at 18 in Figs. 1 and 4. Each collar is split in two semi-circular halves and clamped on the tube by bolts 19, one of the halves carrying the lugs 15 and the other half being a clamping band. By this arrangement two of the legs may easily be adjusted vertically where the ground is uneven.

The body tube has several holes 20 for a pin 21 to occupy and support the lower end 22 of an inner tube 23 which slides snugly in the body tube and has its lower end provided with several notches 24 to resist its rotation upon the supporting pin 21.

The top end of tube 23 is provided with a fixed collar 25 the top of which may have a ball bearing 26. Said collar and ball bearing are fitted in a circular groove 27 in a horizontally rotatable head 28 having two opposite arms 29. The head and arms are preferably hollow and split into halves secured together by bolts 30 and 31. On the latter bolt is placed the upper eye 32 of a coil spring 33 the lower end of which has a hook, or eye, 34 placed on a pin 35 in a gap 36 of a block 37, which is placed on a diametrically fixed pin 38 in the tube 23. It will be noted that said block 37 and lugs 39 in Figs. 1 and 2 prevent loss of twisting motion of the head 28, as will be explained in the operation.

40 is a horizontally disposed roller preferably made with barbs 41 and guard flanges 42. Its journals 43 may be formed by the ends of a shaft 44 extending through the roller. Beyond the flanges 42 one end of the roller has a cylindrical projection 45 engaged by a brake band 46 one end of which is secured at 47 to a bracket 48 which is secured at 49 to one of the arms 29, the other end of the brake band being adjustably secured to the same bracket by a thumbnut 50 by which the tension on the brake is regulated.

The other end of the roller is provided with ratchet teeth 51 engaged by a pawl 52 pivoted at 53 to a bracket 54, which is secured at 55 to the adjacent arm 29 and has a spring 56 tending to hold the pawl engaged or disengaged when the latter is brought to one of the positions 52ˣ in Fig. 3.

The journal boxes 57 are each formed with a cap hinged at 58 (see Fig. 2) and having a gap 59, in and out of which may be swung a bolt 60 pivoted at 61 and having a thumb nut 62. This arrangement enables the operator to readily remove the main roller 40 and substitute special rollers better adapted for special work. Of such special rollers we have shown one in Fig. 5. It has a plain body 40$^a$, but upon that body is placed a collar 63 having a peripheral groove 64. The collar may be made in halves and clamped in place by bolts 65 so as to make it easily exchangeable for a collar with a different form of groove 64. Fig. 5 also helps to explain how either roller may be formed of a shaft 44 having hubs 66 secured at 67 and the body of the roller may be a pipe having each end held either in an annular groove 68 or by a projection 69 of the hub entering into the tube as to the left in Fig. 5.

In the operation of the device, each plank or other piece of lumber to be moved is placed across the roller 40 and pushed toward its destination in a railway car or upon a pile of lumber or away therefrom, one man pushing the plank in the desired direction and another man receiving it and piling it. During such operation it is often necessary to change the direction of the plank while it rests on the roller and in doing so the head 26 swivels on its joint 26—27 and lets the roller deliver the lumber in very handy position to the person receiving it, but as this would leave the roller in a poor position for placing the next plank or board upon it, the spring 33 is relied on to restore the head 26 and thereby the roller 40 to the normal position automatically by the torsional force of the spring. Such normal position may from time to time be altered without moving the legs of the stand on the ground or other supporting surface, the operator simply lifts the head 26 and arms 29 slightly and turns the inner tube with other of its bottom notches 24 upon the pin 21. Whenever raising or lowering of the roller is desired the pin 21 is moved to a different hole 20 in the body tube 10.

When planks or other heavy pieces of lumber, while on the roller, get much higher at one end than at the other the weight of the lumber tends to rotate the roller and move downward. It is to overcome such tendency that the roller is given the burs 41 and brake 46—50, and for handling very heavy lumber also the ratchet wheel 51 and pawl 52. All this refers to handling of rough lumber.

For the handling of finished lumber we remove the barbed roller 40 and the brake 42—43, and substitute a practically smooth roller 40$^b$, shown in Fig. 9. This roller is provided with longitudinal rows of holes or cavities 68$^h$, and upon the roller are two slidable collars 69$^h$ having adjacent flanges 70, and each of them carries a radially slidable catch 71 whose inner end is normally engaged in one of the cavities 68$^h$ by a compression coil spring 73 (shown in Fig. 10) encircling the catch and pressing against a collar fixed or formed near its inner end. The outer end is formed with a head serving as a finger hold to be pulled outward in releasing the catch during the adjusting of the collars toward or away from the middle portion of the roller. In using this roller, the collars are spread or closed to form an intermediate annular space or groove 74 about the width of the board, plank or other material handled, so that in changing the direction of the plank the latter will engage the flanges 70 and cause the head 28 to turn and leave the plank in a transverse position on the roller. The same is the case if bar iron or pipes are handled over the roller. However, for handling mainly bar iron and pipes we prefer using the modified roller 40$^a$ shown in Fig. 5 in which the groove 64 takes the place of the groove or space 74 in Fig. 9. Of course the collar 63 may be exchanged for other similar collars (not shown) having either V-shaped or U-shaped grooves. In exchanging rollers the journal box caps 57 are swung open and closed again.

In Figs. 1 and 8 is shown a collar 75 secured by a set screw 76 or other suitable means upon the stem 23. Between the radial lugs 77 of said collar is pivoted at 78 the upper end of a brace composed of two telescoping members 79 and 80, the latter having a pivoted shoe 81 for use on soft ground and a sharp point 82 for use where the ground is frozen or otherwise hard. The object of this brace is to aid in holding the stand upright when the operator may have to bring a heavy piece of timber to an inclined position against the side of the roller farthest away from the brace. The brace is therefore swingable and securable on the stem 23 to any position most directly opposite from the operator, and by means of its telescoping joint it may have its length adjusted as may be required. To facilitate such adjustment the member is provided in its lower end with a slit 83, and a collar 84 with a screw 85 arranged to clamp the slitted part tight about the member 80.

What we claim is:

1. In a device of the class described a portable stand comprising a central, vertical, tubular body, a horizontally disposed roller, a head with two arms having each a journal bearing for one end of the roller, said head having a stem slidable and rotatable in the tubular body, and means for holding the stem at various elevations in the body, in which the stem has its upper end provided with a fixed collar rotatable in an annular groove in the head and a spring arranged to maintain a predetermined rotary relation between the head and the stem, and means engaging the lower end of the stem to resist its rotation in the body.

2. In a device of the class described, a stand, a stem rotatable in the top of the stand and having two arms, a horizontal roller journaled with its ends in the arms and having upon its surface means for engaging and guiding lumber moved endwise across the roller, and a braking device mounted on one of the arms and engaging the adjacent end of the roller.

3. In a device of the class described a portable stand comprising a central, vertical, tubular body, a horizontally disposed roller, a head with two arms having each a journal bearing for one end of the roller, said head having a stem slidable and rotatable in the tubular body, and means for holding the stem at various elevations in the body, and an extensible supporting brace to touch the ground and having its upper end pivoted to a collar secured on the stem holding the head and means for securing said collar in variously rotated positions on the stem.

4. In a device of the class described and suitably framed a horizontally disposed roller upon which to rest and slide articles, said roller having two collars and means for holding said collars in more or less spread position.

5. In a device of the class described and mounted in a suitable frame, a horizontally disposed roller having a peripheral groove, said groove being formed of the space between two collars adjustably secured upon the roller.

In testimony whereof we affix our signatures.

EDWARD R. WHITE.
MICHAEL J. THORNTON.